United States Patent
Nakashima et al.

(10) Patent No.: US 8,217,524 B2
(45) Date of Patent: Jul. 10, 2012

(54) WIND TURBINE GENERATOR AND BLADE PITCH ANGLE CONTROL METHOD THEREOF

(75) Inventors: Takumi Nakashima, Tokyo (JP); Mitsuya Baba, Tokyo (JP); Yoshiyuki Hayashi, Tokyo (JP); Kazunari Ide, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 190 days.

(21) Appl. No.: 12/768,329

(22) Filed: Apr. 27, 2010

(65) Prior Publication Data

US 2011/0193343 A1    Aug. 11, 2011

(30) Foreign Application Priority Data

Feb. 8, 2010 (JP) ..................... PCT/JP2010/051831

(51) Int. Cl.
*F03D 9/00* (2006.01)
*H02P 9/04* (2006.01)
(52) U.S. Cl. .......................................... 290/44; 290/55
(58) Field of Classification Search .................... 290/44, 290/55
See application file for complete search history.

(56) References Cited

U.S. PATENT DOCUMENTS

| | | | | |
|---|---|---|---|---|
| 3,572,612 A * | 3/1971 | Irbitis | ........................... | 244/7 C |
| 4,160,170 A * | 7/1979 | Harner et al. | ..................... | 290/44 |
| 4,193,005 A * | 3/1980 | Kos et al. | ........................... | 290/44 |
| 4,195,966 A * | 4/1980 | Cornelius | ........................ | 416/18 |
| 4,420,692 A * | 12/1983 | Kos et al. | ........................ | 290/44 |
| 6,208,497 B1 * | 3/2001 | Seale et al. | ..................... | 361/160 |
| 6,443,733 B1 * | 9/2002 | Stone | ............................... | 434/45 |
| 6,942,469 B2 * | 9/2005 | Seale et al. | ................. | 417/413.1 |
| 7,692,322 B2 * | 4/2010 | Wakasa et al. | ................... | 290/44 |
| 7,728,452 B2 * | 6/2010 | Arinaga et al. | ................. | 290/44 |
| 7,755,210 B2 * | 7/2010 | Kammer et al. | ................ | 290/44 |
| 7,880,321 B2 * | 2/2011 | Arinaga et al. | ................. | 290/44 |
| 7,982,327 B2 * | 7/2011 | Arinaga et al. | ................. | 290/44 |
| 8,026,623 B2 * | 9/2011 | Wakasa et al. | ................... | 290/44 |
| 8,039,980 B2 * | 10/2011 | Mizoue et al. | .................. | 290/44 |

(Continued)

FOREIGN PATENT DOCUMENTS

JP 2003-201952 7/2003

(Continued)

*Primary Examiner* — Pedro J Cuevas
(74) *Attorney, Agent, or Firm* — Manabu Kanesaka; Kenneth M. Berner; Benjamin J. Hauptman

(57) ABSTRACT

The present invention provides a wind turbine generator and a blade pitch angle control method thereof in which an aerodynamic imbalance of a wind turbine rotor at the time of shutdown is further reduced, the maximum load of a wind turbine is further reduced, and the wind turbine generator can be reduced in weight and cost. The wind turbine generator includes a collective pitch angle controller 11 that produces a collective pitch angle demand that is common to blade pitch angles of wind turbine blades, an individual pitch angle producing unit 13 that produces an individual pitch angle demand inherent in each wind turbine blade, multipliers 21 to 23 that multiply the individual pitch angle demand by the individual pitch angle gain; an individual pitch angle gain producing unit 14, and adder 24 to 26 that add collective pitch angle demands to the output of the multipliers 21 to 23 and supply the same to pitch actuators 31 to 33 inherent in the wind turbine blades. When shutdown is performed, the individual pitch angle gain is adjusted such that an individual pitch angle gain is reduced gradually and reaches to zero by the individual pitch angle gain producing unit 14 after first set time.

8 Claims, 9 Drawing Sheets

U.S. PATENT DOCUMENTS

| | | | |
|---|---|---|---|
| 8,053,917 B2 * | 11/2011 | Wakasa et al. | 290/44 |
| 2001/0043450 A1 * | 11/2001 | Seale et al. | 361/160 |
| 2004/0094964 A1 * | 5/2004 | Mikhail et al. | 290/44 |
| 2004/0207208 A1 * | 10/2004 | Mikhail et al. | 290/44 |
| 2006/0171091 A1 * | 8/2006 | Seale et al. | 361/160 |
| 2007/0041837 A1 | 2/2007 | Ide et al. | 416/147 |
| 2008/0077284 A1 * | 3/2008 | Swope | 701/5 |
| 2008/0206051 A1 * | 8/2008 | Wakasa et al. | 416/41 |
| 2009/0066089 A1 * | 3/2009 | Arinaga et al. | 290/55 |
| 2009/0148286 A1 | 6/2009 | Kammer et al. | 416/31 |
| 2010/0087960 A1 * | 4/2010 | Hayashi et al. | 700/287 |
| 2010/0140940 A1 * | 6/2010 | Kammer et al. | 290/44 |
| 2010/0187820 A1 * | 7/2010 | Wakasa et al. | 290/44 |
| 2010/0237618 A1 * | 9/2010 | Arinaga et al. | 290/44 |
| 2010/0290905 A1 * | 11/2010 | Knudsen | 416/1 |
| 2011/0042950 A1 * | 2/2011 | Mizoue et al. | 290/44 |
| 2011/0089694 A1 * | 4/2011 | Arinaga et al. | 290/44 |
| 2011/0115233 A1 * | 5/2011 | Schroppel | 290/55 |
| 2011/0156393 A1 * | 6/2011 | Wakasa et al. | 290/44 |
| 2011/0182732 A1 * | 7/2011 | Baba | 416/39 |
| 2011/0184593 A1 * | 7/2011 | Swope | 701/12 |
| 2011/0198846 A1 * | 8/2011 | Wakasa et al. | 290/44 |
| 2011/0266798 A1 * | 11/2011 | Baba | 290/44 |

FOREIGN PATENT DOCUMENTS

| | | |
|---|---|---|
| JP | 2008-278725 | 11/2008 |
| WO | WO 2009/026930 | 3/2009 |
| WO | WO 2009/139066 | 11/2009 |

* cited by examiner

WIND TURBINE GENERATOR AND BLADE PITCH ANGLE CONTROL METHOD THEREOF

RELATED APPLICATIONS

The present application claims the priority of International Application No. PCT/JP2010/051831 filed Feb. 8, 2010, the disclosure of which is hereby incorporated by reference herein in its entirety.

TECHNICAL FIELD

The present invention relates to an individual pitch angle control type wind turbine generator and a blade pitch angle control method thereof, and more particularly, to a wind turbine generator and a blade pitch angle control method thereof for further reducing an aerodynamic imbalance of a wind turbine rotor at the time of shutdown to further reduce the maximum load that becomes a design constraint of a wind turbine, and for reducing the wind turbine generator in weight and cost.

BACKGROUND ART

As shown in FIG. 2, a propeller type wind turbine used in a wind turbine generator includes a plurality of wind turbine blades (usually three wind turbine blades, and a structure having three wind turbine blades will be described herein). A blade pitch angle is controlled so that a predetermined rotation speed and output are obtained in accordance with wind conditions. According to wind turbines of recent years, as a length of the wind turbine blade is increased, individual pitch angle control is included in blade pitch angle control (e.g., Patent Citation 1). According to this control, an individual pitch angle demand that is independent between the wind turbine blades calculated in accordance with an azimuth angle or a load of each wind turbine blade is added to a collective pitch angle demand that is the same for all of the wind turbine blades, and the blade pitch angle is controlled based on the added value. With this individual pitch angle control, it is possible to reduce an amount of variation in rotor out-of-plane load (load that is perpendicular to a rotation plane of the wind turbine rotor), and to increase a fatigue life of the wind turbine.

When an alarm is detected, shutdown control is performed to immediately close the blade pitch angle of the wind turbine blades and to swiftly shut down the wind turbine. When the shutdown control is performed in a wind turbine having the individual pitch angle control, the blade pitch angles of the wind turbine blades are different from each other also when the shutdown is started, and control for closing the blade pitch angles of all of the wind turbine blade is performed from this state at the same pitch rate (that is, feathering is performed to bring the blade pitch angle in parallel to a wind direction). In this case, during the shutdown control, the wind turbine rotor rotates in a state where the blade pitch angles of the wind turbine blades are different from each other irrespective of the azimuth angle or the load, and an aerodynamic imbalance is generated in the wind turbine rotor. An excessive load generated in the entire wind turbine by the aerodynamic imbalance is one of design constraints of the wind turbine, and it is desired to reduce the aerodynamic imbalance.

In order to solve such a problem, Patent Citation 2 proposes the following control technique. For a wind turbine blade (first blade) having a blade pitch angle closest to a fine side, the blade pitch angle is closed at a prescribed maximum pitch rate. For another wind turbine blade having a blade pitch angle closer to a feather side, the blade pitch angle is closed at a pitch rate smaller than the maximum pitch rate until the blade pitch angle of the first blade catches up with the latter wind turbine blade. After the blade pitch angle becomes the same as the blade pitch angle of the first blade, the blade pitch angle is closed at the same pitch rate as that of the first blade, and the blade pitch angles of the three wind turbine blades are allowed to swiftly match with each other for feathering (shut down the wind turbine).

Patent Document 1: Japanese Unexamined Patent Application, Publication No. 2003-201952
Patent Document 2: U.S. Patent Application Publication No. 2009/148286
Patent Document 3: PCT International Publication No. WO2009/139066

DISCLOSURE OF INVENTION

However, in the technique disclosed in Patent Citation 2, the blade pitch angles are closed at a predetermined pitch rate independently from the azimuth angle or the load until the blade pitch angles of the wind turbine blade match with each other after the shutdown is started. Therefore, an aerodynamic imbalance may be generated in the wind turbine rotor due to a difference in the blade pitch angles of the wind turbine blades. Therefore, an excessive load generated in the entire wind turbine remains as a design constraint of the wind turbine due to the aerodynamic imbalance. This excessive load is reflected in strength design of machine parts, thereby increasing weight and cost of the wind turbine generator.

The present invention has been accomplished in view of the above circumstances, and an object of the present invention is to provide a wind turbine generator and a blade pitch angle control method thereof for further reducing an aerodynamic imbalance of a wind turbine rotor at the time of shutdown to further reduce the maximum load that becomes a design constraint of the wind turbine, and for reducing the wind turbine generator in weight and cost.

Technical Solution

In order to solve the above-described problems, the present invention employs the following solutions.

A first aspect of the present invention is a wind turbine generator including: a collective pitch angle producing means that produces a collective pitch angle demand that is common to blade pitch angles of a plurality of wind turbine blades; an individual pitch angle producing means that produces an individual pitch angle demand inherent in each of the wind turbine blades; a multiplying means that multiplies each individual pitch angle demand of the individual pitch angle producing means by an individual pitch angle gain; an individual pitch angle gain producing means that adjusts the individual pitch angle gain such that when shutdown is performed, an individual pitch angle gain is reduced gradually and reaches to zero after first set time; and an adding means that adds the collective pitch angle demand to a result of multiplication carried out by the multiplying means, and supplies a resultant value to a pitch actuator inherent in each of the wind turbine blades.

According to this aspect, when shutdown is performed, it is possible to match the pitch angles of the blades with each other to perform the feathering by gradually reducing the individual pitch angle demand (absolute value) by adjusting an individual pitch angle gain. Even after the shutdown is started, the individual pitch angle control is continued for a given time until the individual pitch angle gain becomes zero. Therefore, even after the shutdown is started, a difference between the pitch angles of the blades can be corresponded to a difference in rotor out-of-plane load that is applied to each blade. Accordingly, it is possible to reduce the individual pitch angle without increasing the aerodynamic imbalance of the wind turbine rotor. As a result, it is possible to further reduce the maximum load that becomes the design constraint of the wind turbine, and to realize a light-weighted and inexpensive wind turbine generator.

In the above-described aspect, the individual pitch angle gain producing means may adjust the individual pitch angle gain based on an n-order decreasing function or a combination of the decreasing functions.

According to this aspect, it is possible to variably set a reduction rate of the individual pitch angle gain with time, and to perform the shutdown control while flexibly responding to various situations such as wind conditions, driving situations, a scale of the wind turbine generator, and types of causes of alarm and the like.

Here, n is an integer not less than one.

In the above-described aspect, the individual pitch angle gain producing means may maintain a predetermined individual pitch angle gain before shutdown until second set time that is shorter than the first set time after the shutdown is started.

Moreover, in the above-described aspect, the first set time or the second set time may be set based on an output of generated electricity of the wind turbine generator, the rotation speed of a wind turbine rotor or the collective pitch angle demand.

The setting of the first set time is equivalent to the setting of the individual pitch angle gain reduction rate, and the setting of the second set time is equivalent to the setting of the individual pitch angle gain reduction-start timing. By setting the individual pitch angle gain reduction-start timing and the reduction rate based on the output of generated electricity of the wind turbine generator, the rotation speed of the wind turbine rotor or the collective pitch angle demand as described above, it is possible to perform the shutdown control while flexibly responding to various situations such as wind conditions, driving situations, a scale of the wind turbine generator, and types of causes of alarm and the like.

A second aspect of the present invention is a blade pitch angle control method of a wind turbine generator including: a collective pitch angle producing step of producing a collective pitch angle demand that is common to blade pitch angles of a plurality of wind turbine blades; an individual pitch angle producing step of producing an individual pitch angle demand inherent in each of the wind turbine blades; a multiplying step of multiplying each individual pitch angle demand of the individual pitch angle producing means by an individual pitch angle gain; an individual pitch angle gain producing step of adjusting the individual pitch angle gain such that when shutdown is performed, an individual pitch angle gain is reduced gradually and reaches to zero after first set time; and an adding step of adding the collective pitch angle demand to a result of multiplication carried out in the multiplying step, and supplying a resultant value to a pitch actuator inherent in each of the wind turbine blades.

According to this aspect, when shutdown is performed, it is possible to match the pitch angles of the blades with each other to perform the feathering by gradually reducing the individual pitch angle demand (absolute value) by adjusting an individual pitch angle gain. Even after the shutdown is started, the individual pitch angle control is continued for a given time until the individual pitch angle gain becomes zero. Therefore, even after the shutdown is started, a difference between pitch angles of the blades can be corresponded to a difference in rotor out-of-plane load that is applied to each blade. Accordingly, it is possible to reduce the individual pitch angle without increasing the aerodynamic imbalance of the wind turbine rotor. As a result, it is possible to further reduce the maximum load that becomes the design constraint of the wind turbine, and to realize a blade pitch angle control method for a light-weighted and inexpensive wind turbine generator.

In the above-described aspect, in the individual pitch angle gain producing step, the individual pitch angle gain may be adjusted based on an n-order decreasing function or a combination of the decreasing functions.

According to this aspect, it is possible to variably set a reduction rate of the individual pitch angle gain with time, and to perform the shutdown control while flexibly responding to various situations such as wind conditions, driving situations, a scale of the wind turbine generator, and types of causes of alarm and the like.

Here, n is an integer not less than one.

In the above-described aspect, in the individual pitch angle gain producing step, a predetermined individual pitch angle gain before shutdown may be maintained until second set time that is shorter than the first set time after the shutdown is started.

Moreover, in the above-described aspect, the first set time or the second set time may be set based on an output of generated electricity of the wind turbine generator, the rotation speed of a wind turbine rotor or the collective pitch angle demand.

According to this aspect, by setting the individual pitch angle gain reduction-start timing and the reduction rate based on the output of generated electricity of the wind turbine generator, the rotation speed of the wind turbine rotor or the collective pitch angle demand, it is possible to perform the shutdown control while flexibly responding to various situations such as wind conditions, driving situations, a scale of the wind turbine generator, and types of causes of alarm and the like.

Advantageous Effects

According to the present invention, when shutdown is performed, it is possible to reduce an individual pitch angle without increasing an aerodynamic imbalance of a wind turbine rotor even after the shutdown is started. As a result, it is possible to further reduce the maximum load that becomes a design constraint of a wind turbine, and to realize a blade pitch angle control method of a light-weighted and inexpensive wind turbine generator.

BEST MODE FOR CARRYING OUT THE INVENTION

An embodiment of a wind turbine generator and a blade pitch angle control method thereof according the present invention will be described below in detail with reference to the drawings. First, a summary of the wind turbine to which the present invention is applied will be described with reference to FIG. 2.

Figure 2:
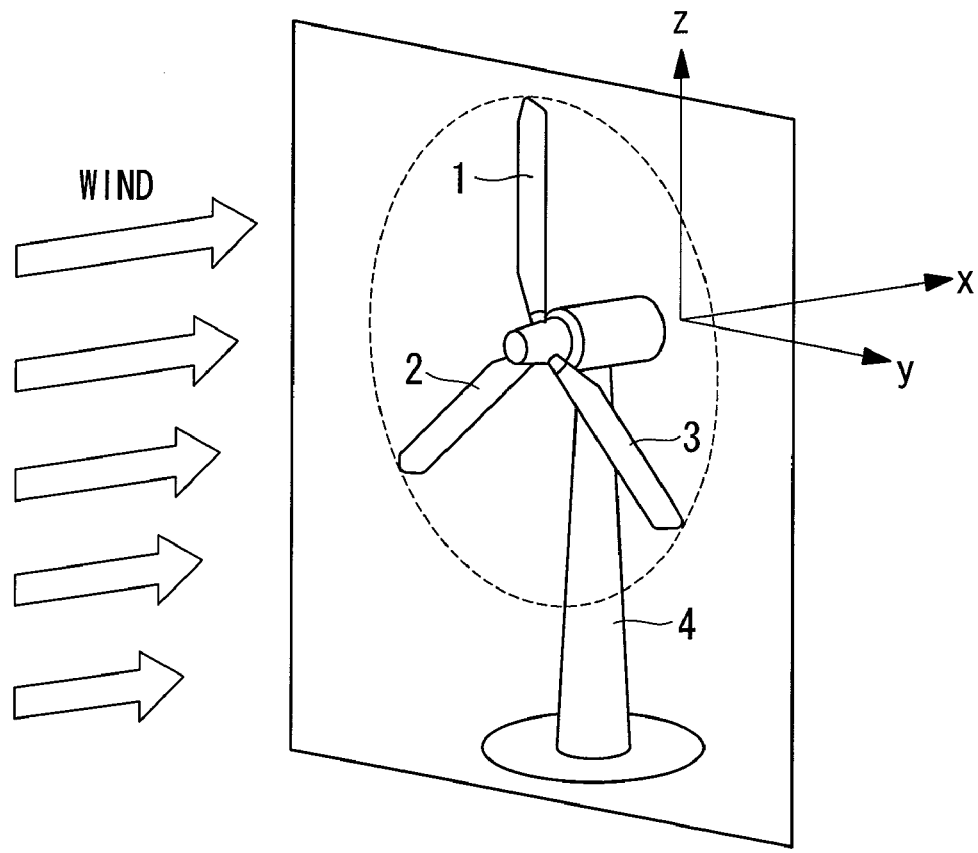
FIG. 2 A perspective view showing a schematic structure of the wind turbine to which the present invention is applied.

As shown in FIG. 2, a propeller type wind turbine to which the wind turbine generator of the present invention is applied includes three wind turbine blades, i.e., a wind turbine blade 1, a wind turbine blade 2 and a wind turbine blade 3 mounted on a wind turbine rotor. The wind turbine rotor is connected to a gear box in a nacelle disposed on an upper portion of a cylindrical tower 4. According to the propeller type wind turbine, the three wind turbine blades 1, 2 and 3 receive wind and rotate together with the wind turbine rotor, and a speed of the rotation is increased by the gear box. Thereafter, the wind turbine blades drive a generator to generate electricity, thereby converting wind power energy into electric energy.

Embodiment

Figure 1:
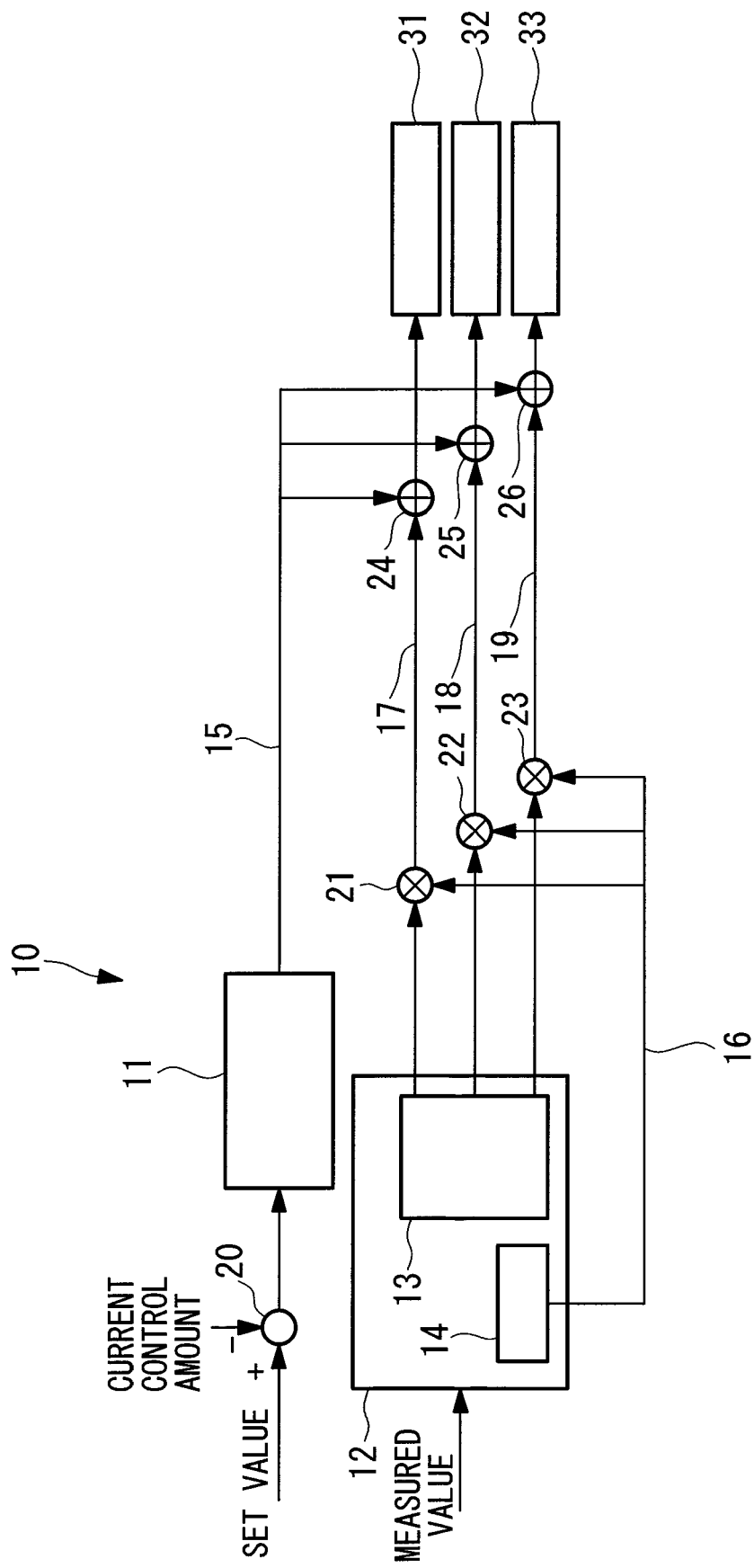
FIG. 1 A block diagram showing a schematic structure of a blade pitch angle controller in a wind turbine generator according to an embodiment of the present invention.

FIG. 1 is a block diagram showing a schematic structure of a blade pitch angle controller in the wind turbine generator according to an embodiment of the present invention.

In FIG. 1, a blade pitch angle controller 10 of the wind turbine generator of the present embodiment includes a collective pitch angle controller 11, an individual pitch angle controller 12, a subtractor 20, multipliers 21, 22 and 23, adders 24, 25 and 26, a first blade pitch actuator 31, a second blade pitch actuator 32 and a third blade pitch actuator 33.

The collective pitch angle controller 11 corresponds to a collective pitch angle producing means in claims, and produces a collective pitch angle demand that is common to blade pitch angles of the three wind turbine blades 1, 2 and 3. A deviation between the rotation speed, a set value of an output of generated electricity and a current control amount is obtained by the subtractor 20, and a collective pitch angle demand 15 is produced based on this deviation.

Figure 3:
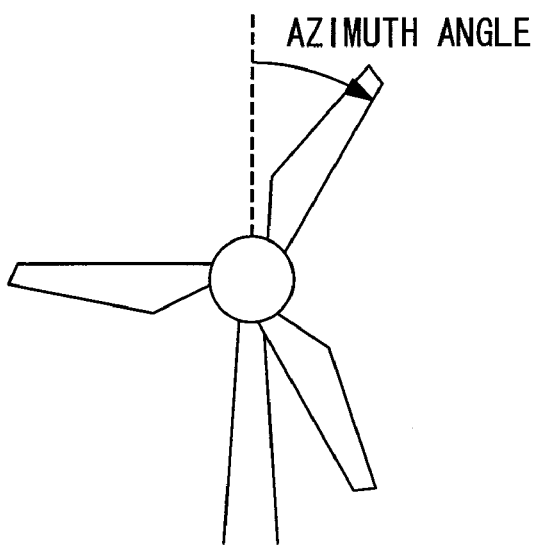
FIG. 3 A partial front view showing a wind turbine blade portion in FIG. 2 for describing an azimuth angle.

The individual pitch angle controller 12 includes an individual pitch angle producing unit (individual pitch angle producing means) 13 and an individual pitch angle gain producing unit 14. The individual pitch angle producing unit 13 produces an individual pitch angle demand that is inherent in the wind turbine blades 1, 2 and 3 based on a measured value such as an azimuth angle and a load. As shown in FIG. 3, the azimuth angle is an angle formed between the wind turbine blade and a vertical direction (direction z). The azimuth angle is 0° when a reference wind turbine blade is located at the uppermost portion of the wind turbine, and the azimuth angle is 180° when the reference wind turbine blade is located at the lowermost position.

A technique for producing the individual pitch angle demand in the individual pitch angle producing unit 13 is not particularly limited, and a known technique may be used. For example, Japanese Unexamined Patent Application, Publication No. 2005-83308 discloses a technique for producing the individual pitch angle demand in accordance with a wind speed, air density and output of generated electricity based on a measured azimuth angle. Japanese Unexamined Patent Application, Publication Nos. 2003-113769 and 2005-325742 disclose a technique for producing an individual pitch angle demand based on a measured load.

When shutdown is performed, the individual pitch angle gain producing unit 14 adjusts an individual pitch angle gain 16 such that an individual pitch angle gain (=1) is reduced gradually and reaches to zero after first set time. A characteristic structure of the present invention is that the multipliers 21, 22 and 23 multiply the individual pitch angle demands of the blades produced by the individual pitch angle producing unit 13 by an individual pitch angle gain 16 produced by the individual pitch angle gain producing unit 14, thereby producing a first blade pitch angle demand 17, a second blade pitch angle demand 18, and a third blade pitch angle demand 19.

At the time of a normal operation, the individual pitch angle gain 16 is one. In this case, the individual pitch angle demands of the blades produced by the individual pitch angle producing unit 13 become the first blade pitch angle demand 17, the second blade pitch angle demand 18 and the third blade pitch angle demand 19 as they are. When the shutdown is performed, the individual pitch angle gain 16 is gradually reduced based on a primary decreasing function, and when the first set time is elapsed after the shutdown is started, the individual pitch angle gain 16 becomes zero. That is, the first blade pitch angle demand 17, the second blade pitch angle demand 18 and the third blade pitch angle demand 19 are gradually reduced toward zero from the individual pitch angle demands of the blades produced by the individual pitch angle producing unit 13 until the first set time is elapsed after the shutdown is started.

A collective pitch angle demand 15 produced by the collective pitch angle controller 11 is respectively added to the first blade pitch angle demand 17, the second blade pitch angle demand 18 and the third blade pitch angle demand 19 which are respectively output values of the multipliers 21, 22 and 23 by means of the adders 24, 25 and 26, respectively, and resultant values are supplied to the first blade pitch actuator 31, the second blade pitch actuator 32 and the third blade pitch actuator 33, respectively.

Herein, the first blade pitch actuator 31, the second blade pitch actuator 32 and the third blade pitch actuator 33 are pitch actuators which are inherent in the wind turbine blades 1, 2 and 3, and are driven, for example, by a hydraulic cylinder or an electric motor.

Figure 4:
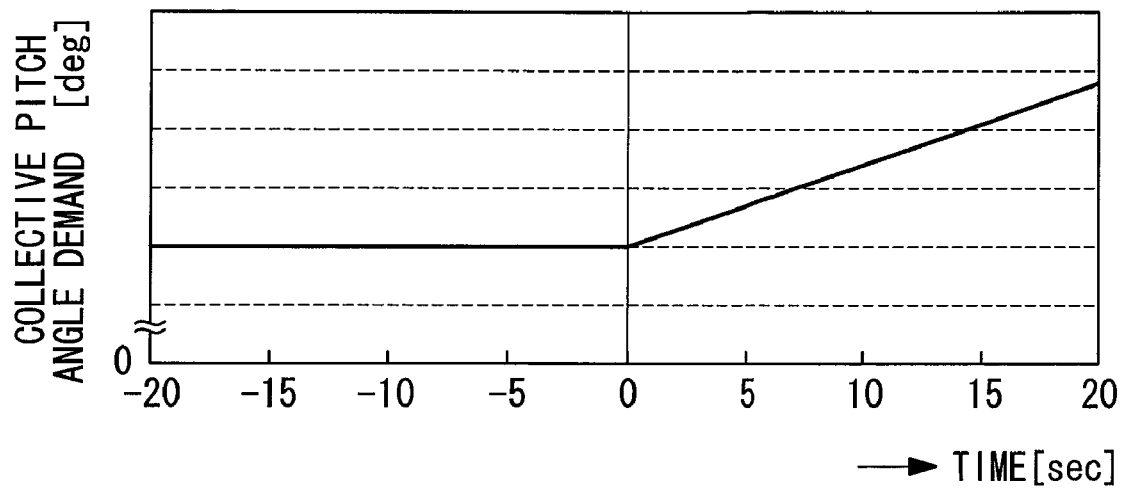
FIG. 4 A graph showing time transition of a collective pitch angle demand in blade pitch angle control in the wind turbine generator of the present embodiment.
Figure 5:
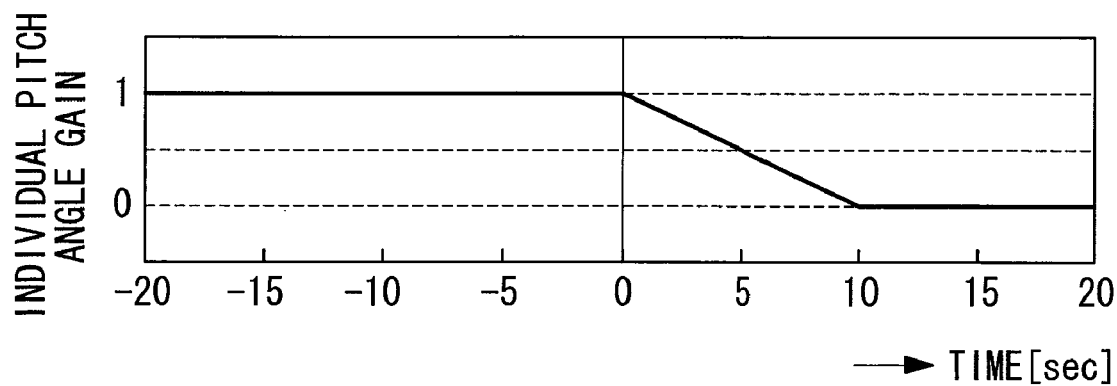
FIG. 5 A graph showing time transition of an individual pitch angle gain in the blade pitch angle control in the wind turbine generator of the present embodiment.
Figure 6:
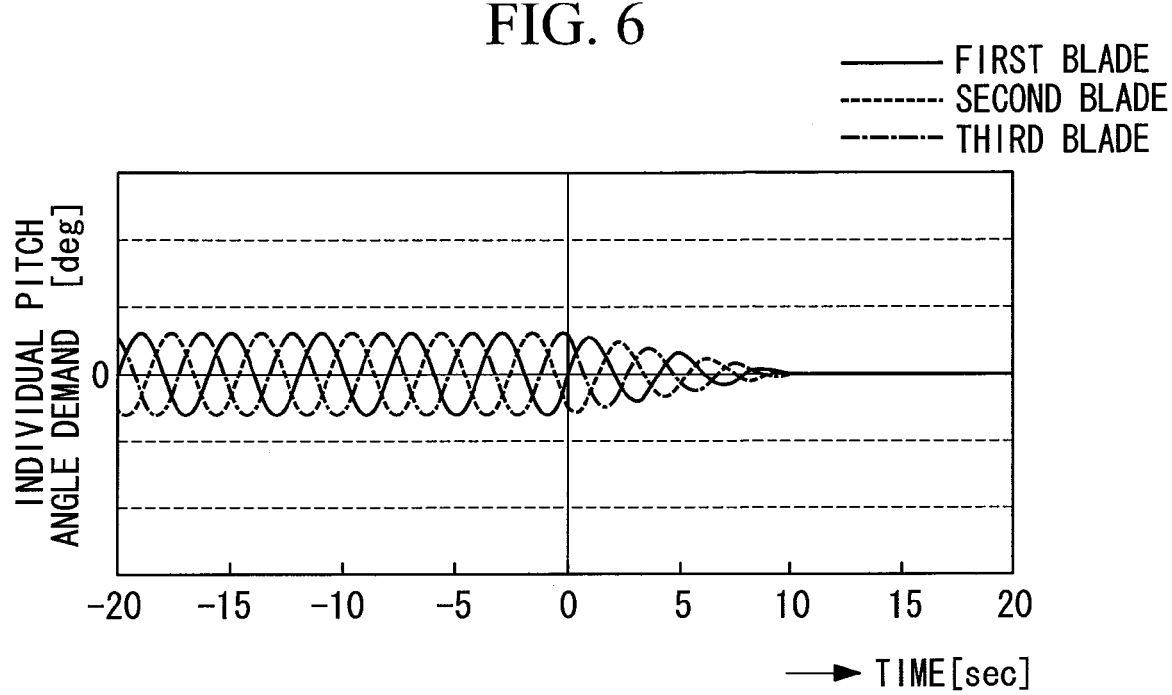
FIG. 6 A graph showing time transition of an individual pitch angle demand in the blade pitch angle control in the wind turbine generator of the present embodiment.
Figure 7:
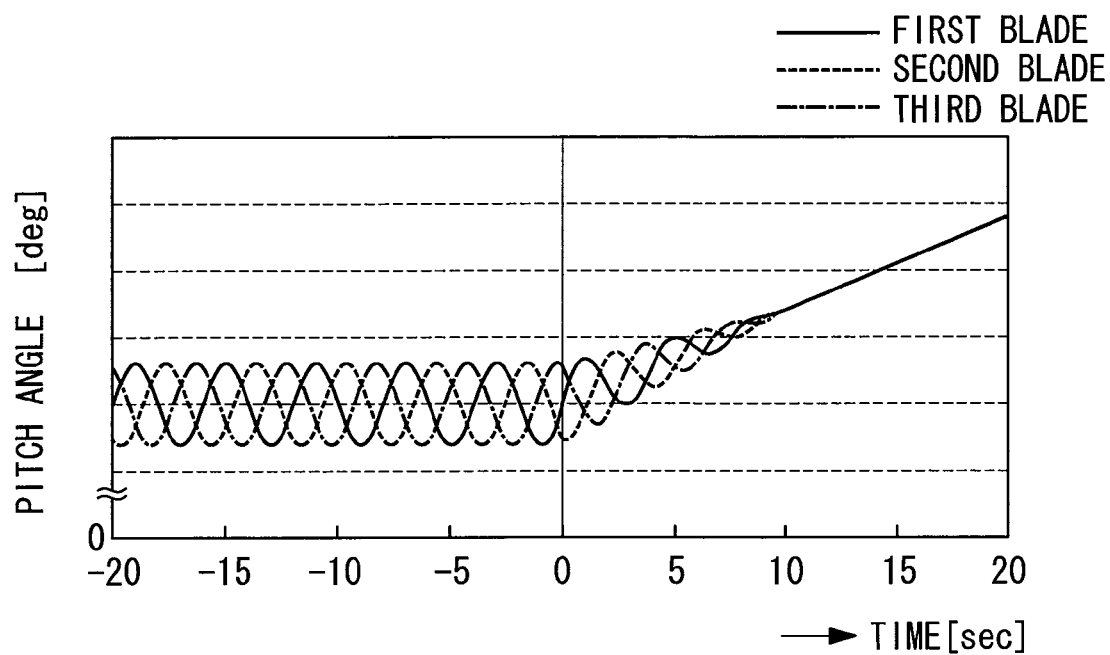
FIG. 7 A graph showing time transition of a pitch angle in the blade pitch angle control in the wind turbine generator of the present embodiment.
Figure 8:
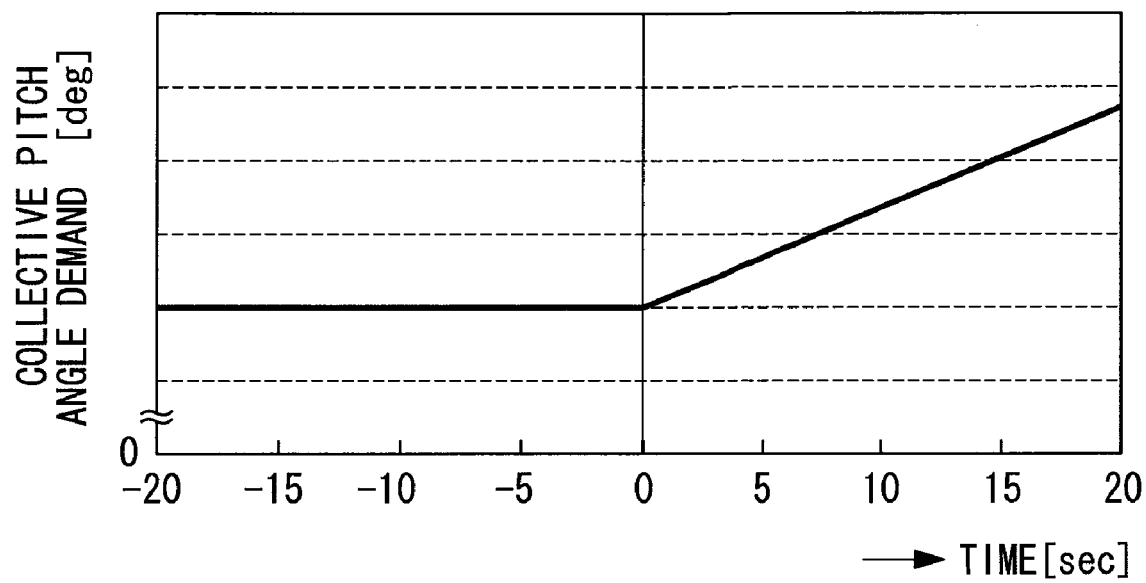
FIG. 8 A graph showing time transition of a collective pitch angle demand in blade pitch angle control of a first conventional example.
Figure 9:
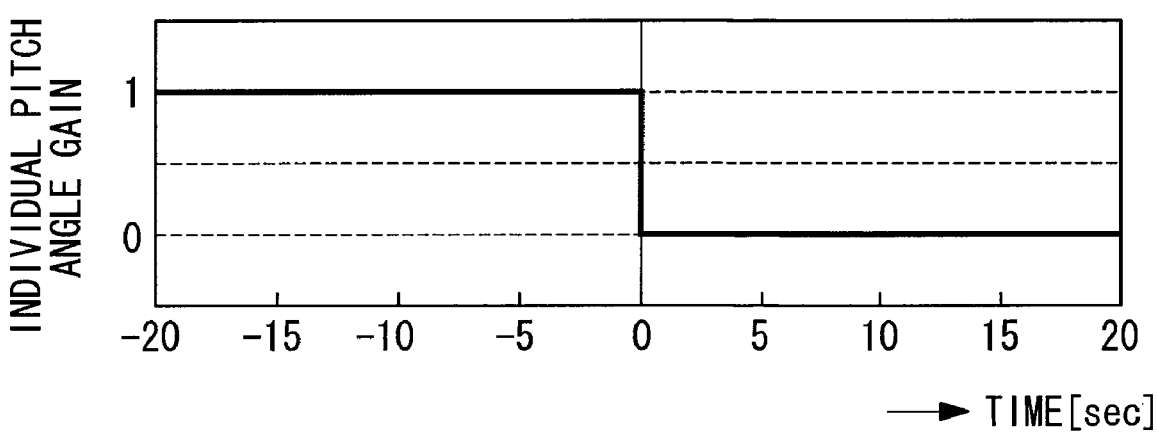
FIG. 9 A graph showing time transition of an individual pitch angle gain in the blade pitch angle control of the first conventional example.
Figure 10:
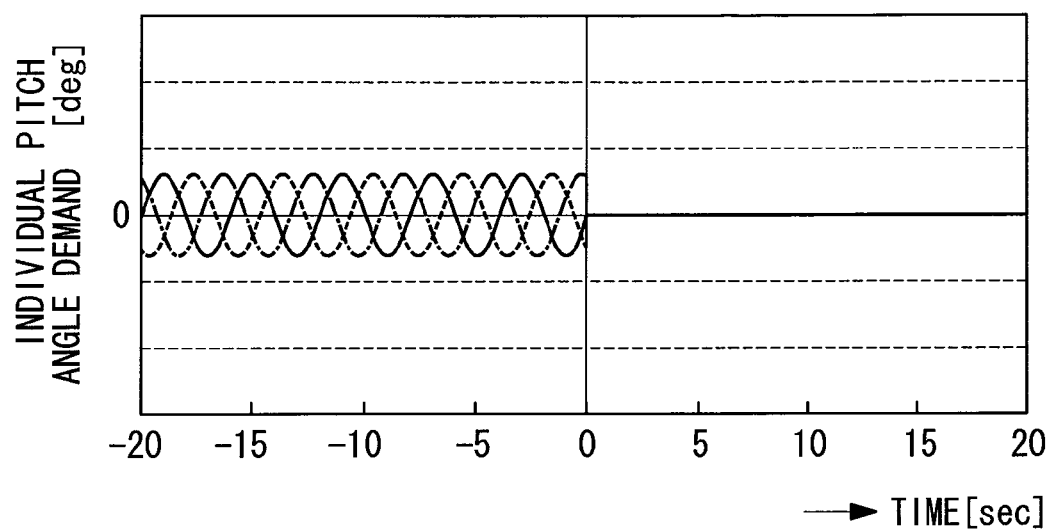
FIG. 10 A graph showing time transition of the individual pitch angle demand in the blade pitch angle control of the first conventional example.
Figure 11:
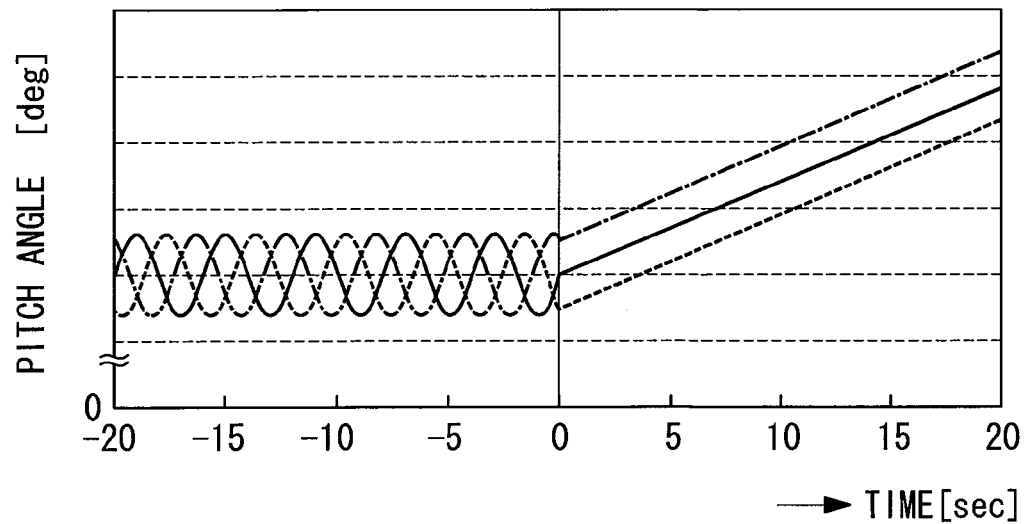
FIG. 11 A graph showing time transition of the pitch angle in the blade pitch angle control of the first conventional example.
Figure 12:
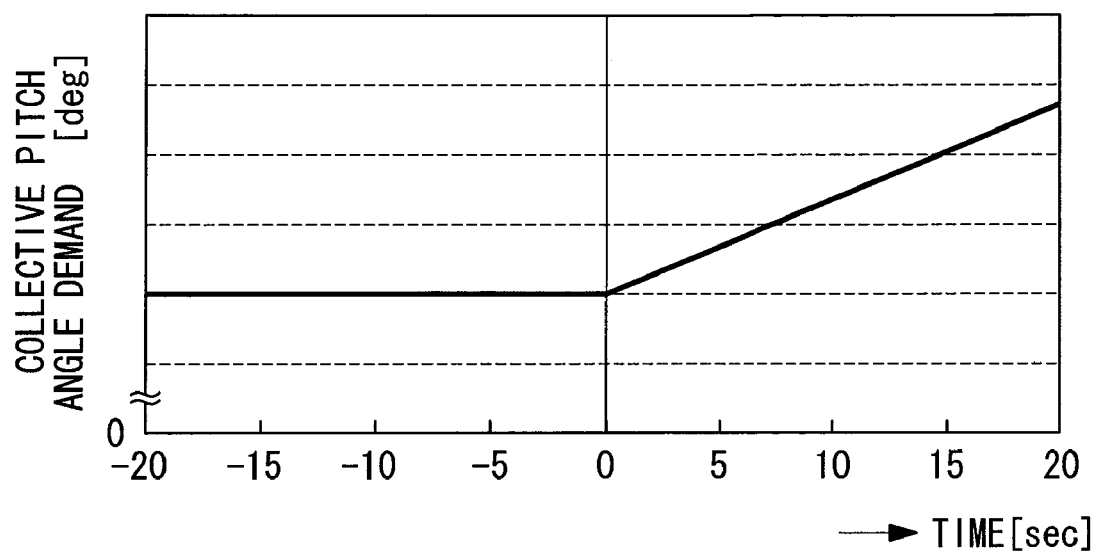
FIG. 12 A graph showing time transition of the collective pitch angle demand in blade pitch angle control of a second conventional example.
Figure 13:
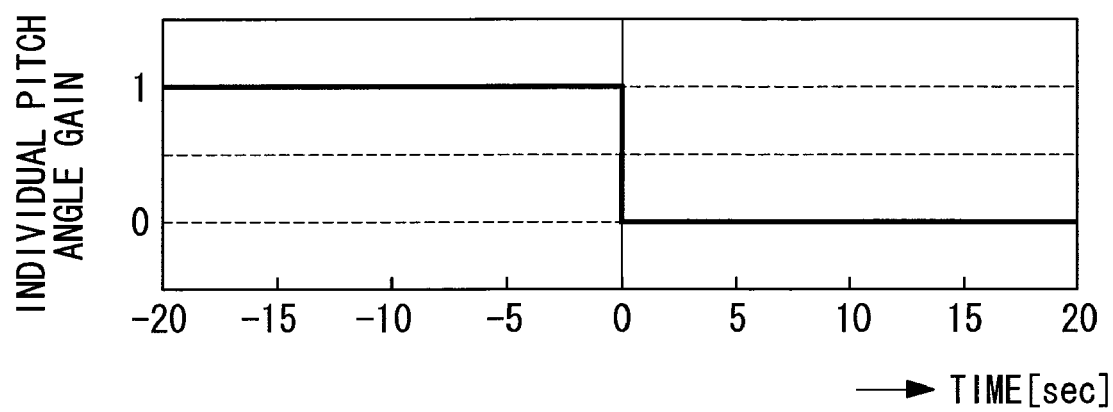
FIG. 13 A graph showing time transition of the individual pitch angle gain in the blade pitch angle control of the second conventional example.
Figure 14:
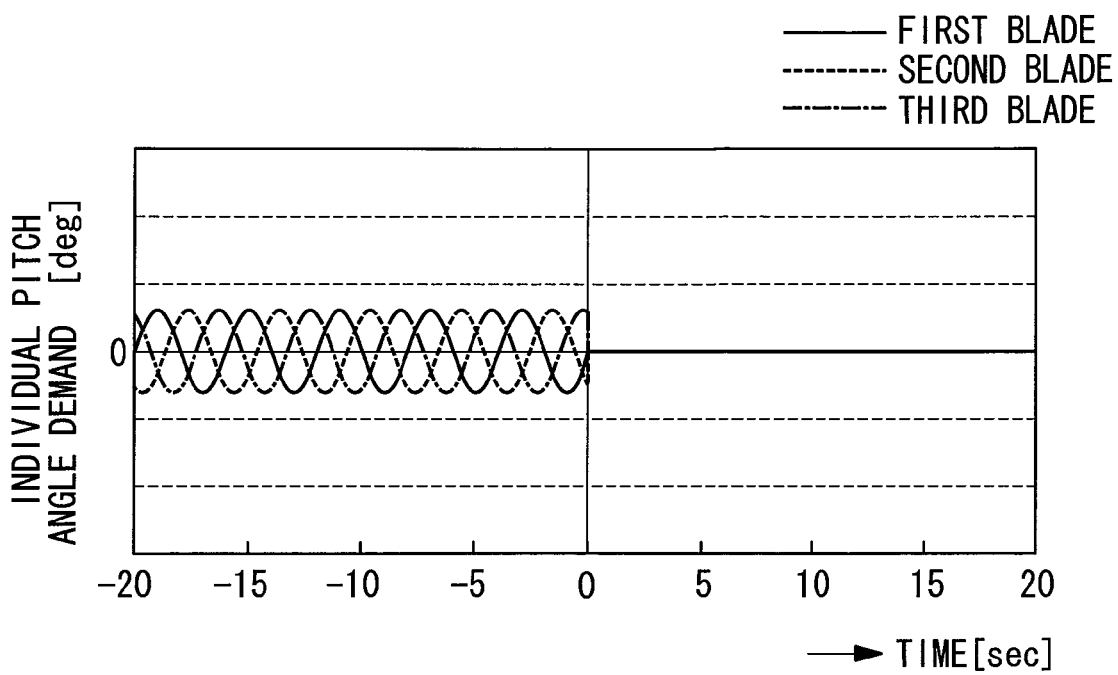
FIG. 14 A graph showing time transition of the individual pitch angle demand in the blade pitch angle control of the second conventional example.
Figure 15:
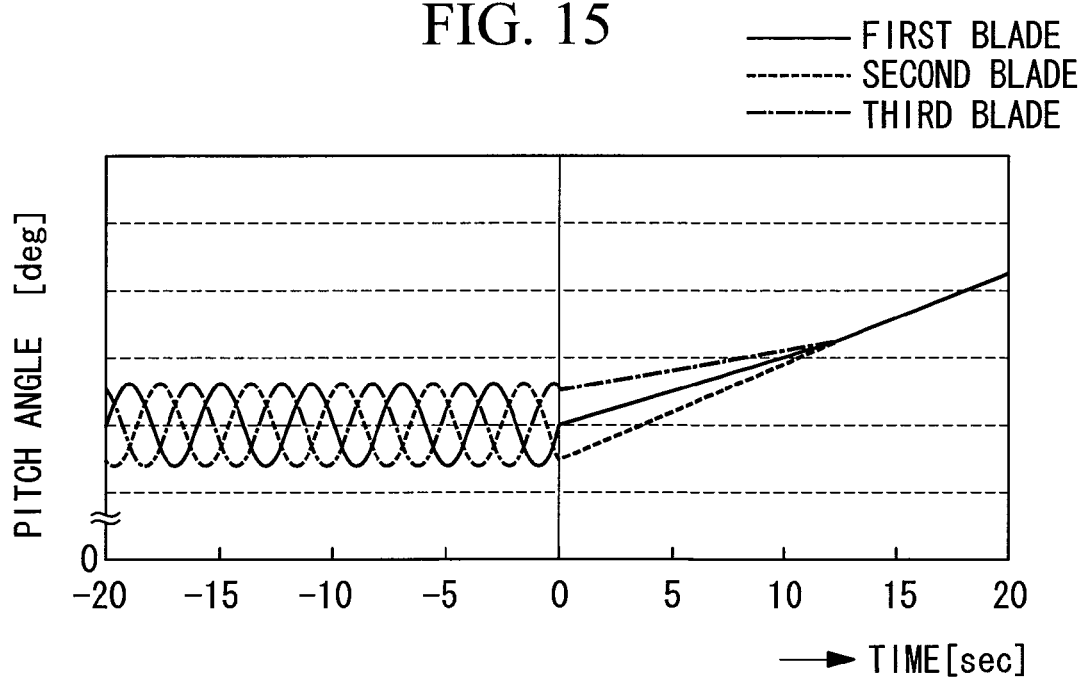
FIG. 15 A graph showing time transition of the pitch angle in the blade pitch angle control of the second conventional example.

Next, a blade pitch angle control method of the wind turbine generator having the above-described constituent elements will be described with reference to FIGS. 4 to 15. FIGS. 4 to 7 are explanatory diagrams of blade pitch angle control in the wind turbine generator of the present embodiment. FIGS. 8 to 11 are explanatory diagrams of blade pitch angle control in a first conventional example. FIGS. 12 to 15 are explanatory diagrams of blade pitch angle control in a second conventional example. FIGS. 4, 8 and 12 are graphs showing time transition of the collective pitch angle demand 15 before and after the shutdown. FIGS. 5, 9 and 13 are graphs showing time transition of the individual pitch angle gain 16 before and after the shutdown is started. FIGS. 6, 10 and 14 are graphs showing time transition of the first blade pitch angle demand 17, the second blade pitch angle demand 18 and the third blade pitch angle demand 19 before and after the shutdown is started. FIGS. 7, 11 and 15 are graphs showing time transition of the pitch angles of the blades before and after the shutdown is started. In the figures except FIGS. 5, 9 and 13, a vertical axis shows the blade pitch angle, an upper side in the graphs corresponds to a feather side, and a lower side in the graphs corresponds to a fine side.

In the second conventional example, the technique in the Patent Citation 2 is applied to the wind turbine generator of the present embodiment. In the first conventional example, a known technique (e.g., Patent Citation 1 for example) to which the technique of the Patent Citation 2 is not applied is applied to the wind turbine generator of the present embodiment. Although the individual pitch angle gain itself does not exist in the first conventional example and the second conventional example, they are shown for comparison with the present embodiment.

First, the individual pitch angle control at the time of the normal operation before the shutdown is started will be described with reference to FIGS. 4 to 7 (as representative drawings). At the time of the normal operation, it is assumed that the same control is performed in the present embodiment, the first conventional example and the second conventional example.

At the time of the normal operation, the collective pitch angle demand 15 that is common to the blade pitch angles of the three wind turbine blades 1, 2 and 3 is produced by the collective pitch angle controller 11. In FIG. 4, the collective pitch angle demand 15 is indicated as a constant value since time before the shutdown is as short as 20 seconds. As shown in FIG. 5, the individual pitch angle gain 16 that is outputted from the individual pitch angle gain producing unit 14 at this time is 1.

The individual pitch angle producing unit 13 produces individual pitch angle demands (first blade pitch angle demand 17, the second blade pitch angle demand 18 and the third blade pitch angle demand 19) which are inherent in the wind turbine blades 1, 2 and 3 based on a measured value such as an azimuth angle and a load (see FIG. 6). Although FIG. 6 shows a variation in time of the individual pitch angle demand of each blade as cosine, it is assumed that wind is stable (uniform wind speed in terms of time and plane) for ease of understanding, and strictly speaking, this variation in time is different from the actual variation.

The collective pitch angle demand 15 in FIG. 4 and the individual pitch angle demand of each blade in FIG. 6 are added to each other, a resultant value is supplied to the first blade pitch actuator 31, the second blade pitch actuator 32 and the third blade pitch actuator 33 of the blades, and the pitch angles of the blades as shown in FIG. 7 are obtained. With such individual pitch angle control, it is possible to reduce an amount of variation in a rotor out-of-plane load (load that is perpendicular to the rotation plane of the wind turbine rotor; load applied in a direction x in FIG. 2).

Next, control of the individual pitch angle when the shutdown is controlled after the shutdown is started will be described in the order of the first conventional example, the second conventional example and the present embodiment.

First, in the first conventional example, when the shutdown is controlled, the collective pitch angle demand is controlled to a full-feather angle at a constant pitch rate for all of the blades as shown in FIG. 8 to shut down the wind turbine rotor. The production of the individual pitch angle demand of each blade by the individual pitch angle producing unit 13 is stopped simultaneously when the shutdown is started (see FIG. 10), and the individual pitch angle gain is immediately switched from 1 to 0 (see FIG. 9).

When the shutdown is started, the blade pitch angles of the wind turbine blades are relatively deviated from each other, but according to the shutdown control in the first conventional example, the feathering is performed based on the collective pitch angle demand while maintaining this relatively deviated relation of the blade pitch angles (see FIG. 11). Therefore, the wind turbine rotor rotates in a state where the blade pitch angles of the wind turbine blades are different from each other (irrespective of load) during the shutdown control, and aerodynamic imbalance is generated in the wind turbine rotor.

Next, in the second conventional example, as in the first conventional example, the collective pitch angle demand is controlled to a full feather angle at a constant pitch rate for all of the blades as shown in FIG. 12. The production of the individual pitch angle demand of each blade by the individual pitch angle producing unit 13 is stopped simultaneously when the shutdown is started (see FIG. 14), and the individual pitch angle gain is immediately switched from 1 to 0 (see FIG. 13).

When the shutdown is started, the blade pitch angles of the wind turbine blades are relatively deviated from each other, but in the shutdown control of the second conventional example, a wind turbine blade (second blade in FIG. 14) in which the blade pitch angle is closest to the fine side is allowed to perform feathering at a prescribed maximum pitch rate, and other wind turbine blades (first and third blades in FIG. 14) located on the feather side are allowed to perform feathering at a pitch rate smaller than the maximum pitch rate until the blade pitch angle of the second blade catches up. After the blade pitch angles of the first and third blades become equal to the blade pitch angle of the second blade, the blades are allowed to perform the feathering at the maximum pitch rate. In this manner, the blade pitch angles of the three wind turbine blade are allowed to swiftly match with each other and perform the feathering.

As shown in FIG. 15, in the shutdown control of the second conventional example, the blade pitch angles are closed with a predetermined pitch rate irrespective of a load in a period that is elapsed after the shutdown is started until the blade pitch angles of the wind turbine blades match with each other (for about 12 seconds in FIG. 15), and an aerodynamic imbalance caused by a difference between the blade pitch angles of the wind turbine blade may be generated in the wind turbine rotor.

In contrast to the first conventional example and the second conventional example, in the present embodiment, the collective pitch angle demand is controlled to the full feather angle at a constant pitch rate of every blade as shown in FIG. 4 to stop the wind turbine rotor at the time of shutdown control.

Even after the shutdown is started, the production of the individual pitch angle demand of each blade by the individual pitch angle producing unit 13 is continued in the same manner as that before the shutdown is started. The individual pitch angle demand is multiplied by the individual pitch angle gain 16 (see FIG. 5) that is gradually reduced based on the primary decreasing function, and the individual pitch angle demand is gradually reduced to zero (see FIG. 6). In FIG. 5, the first set time in the individual pitch angle gain producing unit 14 is 10 seconds.

When the shutdown is started, the blade pitch angles of the wind turbine blades are relatively deviated from each other, but in the shutdown control according to the present embodiment, as shown in FIG. 7, the control of the individual pitch angle is continued while gradually reducing the individual pitch angle during a period (10 seconds in FIG. 7) that is elapsed after the shutdown is started until the blade pitch angle of each wind turbine blade matches with the collective pitch angle demand 15. In this manner, a difference between the pitch angles of the blades corresponds to a difference between the rotor out-of-plane loads that are applied to the blades even after the shutdown is started, and the individual pitch angle can be reduced as compared with the conventional examples without increasing the aerodynamic imbalance of the wind turbine rotor.

As described above, the wind turbine generator and the blade pitch angle control method thereof of the present embodiment includes the collective pitch angle controller 11 that produces the collective pitch angle demand 15 that is common to the blade pitch angles of the wind turbine blades, the individual pitch angle producing unit 13 that produces the individual pitch angle demand inherent in each wind turbine blade, the multipliers 21 to 23 that multiply the individual pitch angle demand by the individual pitch angle gain 16 to produce the first blade pitch angle demand 17, the second blade pitch angle demand 18 and the third blade pitch angle demand 19, an individual pitch angle gain producing unit 14, and adder 24 to 26 that add the collective pitch angle demand 15 to the output of the multipliers 21 to 23 and supply the same to the pitch actuators 31 to 33 inherent in the wind turbine blades. When shutdown is performed, the individual pitch angle gain is adjusted such that an individual pitch angle gain is reduced gradually and reaches to zero by the individual pitch angle gain producing unit 14 after the first set time.

As described above, when the shutdown is performed, by producing the first blade pitch angle demand 17, the second blade pitch angle demand 18 and the third blade pitch angle demand 19 that gradually reduce the individual pitch angle demand (absolute value) by adjusting the individual pitch angle gain 16, the pitch angles of the blades match with each other and the feathering is performed. However, the control of the individual pitch angle is continued for given time even after the shutdown is started. Therefore, the difference between the pitch angles of the blades after the shutdown is started corresponds to the difference between the rotor out-of-plane loads that are applied to the blades, and the individual pitch angle can be reduced as compared with the conventional examples without increasing the aerodynamic imbalance of the wind turbine rotor. As a result, it is possible to further reduce the maximum load that becomes a design constraint of the wind turbine, and to realize a blade pitch angle control method of a light-weighted and inexpensive wind turbine generator.

Since the variation in load is reduced during a period in which the individual pitch angle gain 16 becomes zero, there is an effect that a fatigue load reduction effect of the wind turbine is continuously obtained even after the shutdown is started, and a fatigue life of the wind turbine can further be increased.

First Modification

In the above-described embodiment, when shutdown is performed, the individual pitch angle gain 16 is adjusted such that an individual pitch angle gain is reduced gradually and reaches to zero after the first set time by the individual pitch angle gain producing unit 14, and the reduction of the individual pitch angle gain 16 is started simultaneously when the shutdown is started. Alternatively, a predetermined individual pitch angle gain before the shutdown may be maintained during second set time (second set time is shorter than the first set time) after the shutdown is started, and adjustment may be performed such that the individual pitch angle gain is gradually reduced during a period from the second set time to the first set time.

Figure 16:
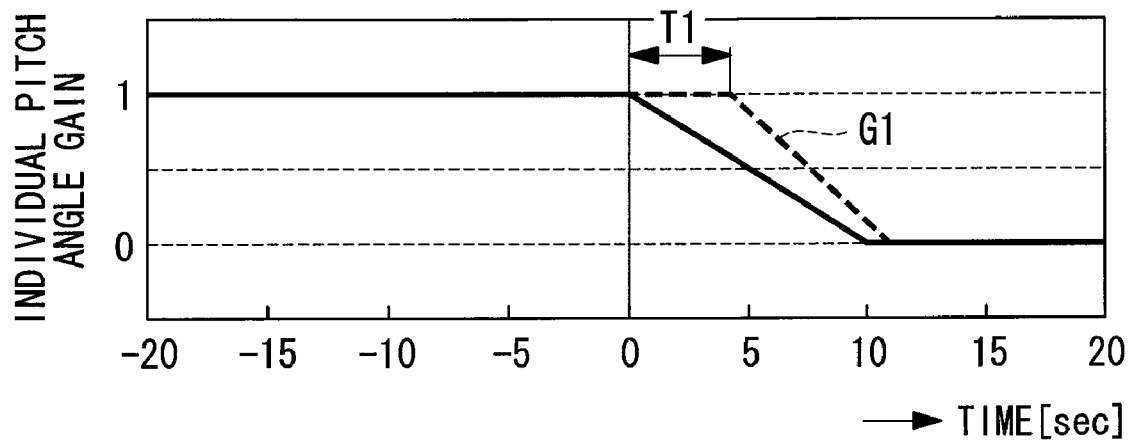
FIG. 16 An explanatory diagram showing time transition of an individual pitch angle gain of a first modification.

FIG. 16 shows time transition G1 of the individual pitch angle gain 16 of the present modification. According to G1 in FIG. 16, second set time T1 is 4 seconds and first set time is 12 seconds. The individual pitch angle gain 16 is gradually reduced during a period from the second set time to the first set time based on the primary decreasing function.

Although the first set time and the second set time T1 are simply set as time, the first set time and the second set time T1 may be set based on the output of generated electricity of the wind turbine generator, the rotation speed of the wind turbine rotor or the collective pitch angle demand.

Concerning the second set time T1, a threshold value of the output of generated electricity, the rotation speed of the wind turbine rotor or the collective pitch angle demand may be set in advance, and when the output of generated electricity, the rotation speed of the wind turbine rotor or the collective pitch angle demand 15 reaches the threshold value, the reduction of the individual pitch angle gain may be started.

The setting of the first set time is equivalent to the setting of the reduction rate of the individual pitch angle gain 16. A correspondence table of the first set time corresponding to the output of generated electricity, the rotation speed of the wind turbine rotor or the collective pitch angle demand may be prepared in advance, and the first set time may be set in accordance with the output of generated electricity at the time of the shutdown, the rotation speed of the wind turbine rotor or the collective pitch angle demand 15.

By setting the reduction-start timing or a reduction rate of the individual pitch angle gain 16 based on the output of generated electricity of the wind turbine generator, the rotation speed of the wind turbine rotor or the collective pitch angle demand, shutdown can be controlled while flexibly responding to various situations such as wind conditions, driving situations, a scale of the wind turbine generator, and types of causes of alarm and the like.

Second Modification

In the above-described embodiment and the first modification, when shutdown is performed, the individual pitch angle gain 16 is gradually reduced by the individual pitch angle gain producing unit 14 based on the primary decreasing function. Alternatively, the individual pitch angle gain may be adjusted based on an n-order decreasing function (e.g., a secondary decreasing function) or a combination of the decreasing functions.

Figure 17:
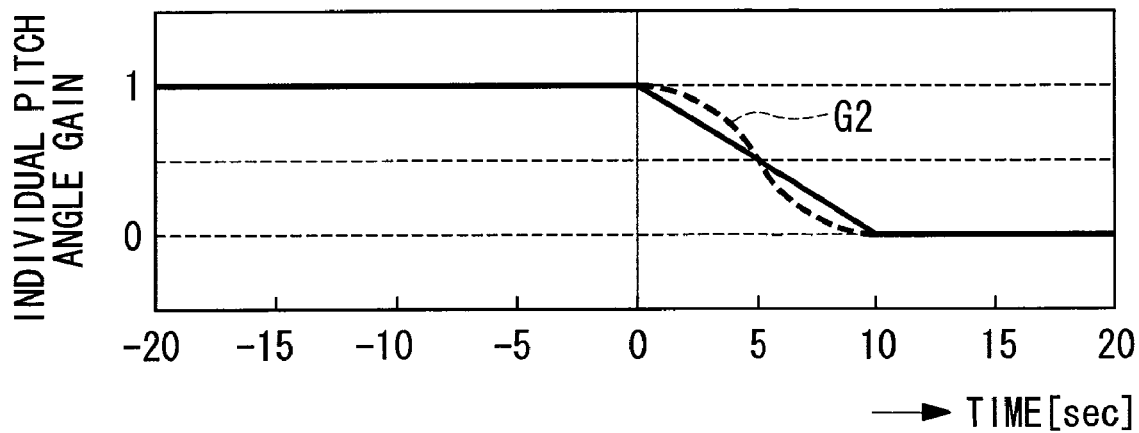
FIG. 17 An explanatory diagram showing time transition of an individual pitch angle gain of a second modification.

FIG. 17 shows time transition G2 of the individual pitch angle gain 16 of the present modification. According to G2 in FIG. 17, the individual pitch angle gain 16 is gradually reduced from 1 to 0.5 based on an elliptic function, and from 0.5 to 0 based on an inverse function.

By making it possible to variably set the reduction rate of the individual pitch angle gain 16 with time, shutdown can be controlled while flexibly responding to various situations such as wind conditions, driving situations, a scale of the wind turbine generator, and types of causes of alarm and the like.

Although the embodiment and its modifications of the present invention have been described in detail with reference to the drawings, the present invention is not limited to the above-described embodiment and the modifications, and design changes within a range not departing from a subject matter of the invention fall within the present invention. For example, the number of wind turbine blades is not limited to three, and the number of the blades may be two or four or more.

EXPLANATION OF REFERENCE 1, 2, 3: wind turbine blade
4: tower
11: collective pitch angle controller (collective pitch angle producing means)
12: individual pitch angle controller
13: individual pitch angle producing unit (individual pitch angle producing means)
14: individual pitch angle gain producing unit (individual pitch angle gain producing means)
20: subtractor
21, 22, 23: multiplier (multiplying means)
24, 25, 26: adder (adding means)
31: first blade pitch actuator
32: second blade pitch actuator
33: third blade pitch actuator

The invention claimed is:

1. A wind turbine generator comprising:
a collective pitch angle producing means that produces a collective pitch angle demand that is common to blade pitch angles of a plurality of wind turbine blades;
an individual pitch angle producing means that produces an individual pitch angle demand inherent in each of the wind turbine blades;
a multiplying means that multiplies each individual pitch angle demand of the individual pitch angle producing means by an individual pitch angle gain;
an individual pitch angle gain producing means that adjusts the individual pitch angle gain such that when shutdown is performed, an individual pitch angle gain is reduced gradually and reaches to zero after first set time; and
an adding means that adds the collective pitch angle demand to a multiplication result carried out by the multiplying means, and supplies a resultant value to a pitch actuator inherent in each of the wind turbine blades.

2. The wind turbine generator according to claim 1, wherein the individual pitch angle gain producing means adjusts the individual pitch angle gain based on an n-order decreasing function or a combination of the decreasing functions.

3. The wind turbine generator according to claim 1, wherein the individual pitch angle gain producing means maintains a predetermined individual pitch angle gain before shutdown until second set time that is shorter than the first set time after the shutdown is started.

4. The wind turbine generator according to claim 1, wherein the first set time or the second set time is set based on an output of generated electricity of the wind turbine generator, the rotation speed of a wind turbine rotor or the collective pitch angle demand.

5. A blade pitch angle control method of a wind turbine generator comprising:
a collective pitch angle producing step of producing a collective pitch angle demand that is common to blade pitch angles of a plurality of wind turbine blades;
an individual pitch angle producing step of producing an individual pitch angle demand inherent in each of the wind turbine blades;
a multiplying step of multiplying each individual pitch angle demand of the individual pitch angle producing means by an individual pitch angle gain;
an individual pitch angle gain producing step of adjusting the individual pitch angle gain such that when shutdown is performed, an individual pitch angle gain is reduced gradually and reaches to zero after first set time; and
an adding step of adding the collective pitch angle demand to a result of multiplication carried out in the multiplying step, and supplying a resultant value to a pitch actuator inherent in each of the wind turbine blades.

6. The blade pitch angle control method of the wind turbine generator according to claim 5, wherein in the individual pitch angle gain producing step, the individual pitch angle gain is adjusted based on an n-order decreasing function or a combination of the decreasing functions.

7. The blade pitch angle control method of the wind turbine generator according to claim 5, wherein in the individual pitch angle gain producing step, a predetermined individual pitch angle gain before shutdown is maintained until second set time that is shorter than the first set time after the shutdown is started.

8. The blade pitch angle control method of the wind turbine generator according to claim 5, wherein the first set time or the second set time is set based on an output of generated electricity of the wind turbine generator, the rotation speed of a wind turbine rotor or the collective pitch angle demand.

* * * * *